(No Model.)
S. M. MATHEWS.
ELECTRIC ALARM.
No. 477,950. Patented June 28, 1892.
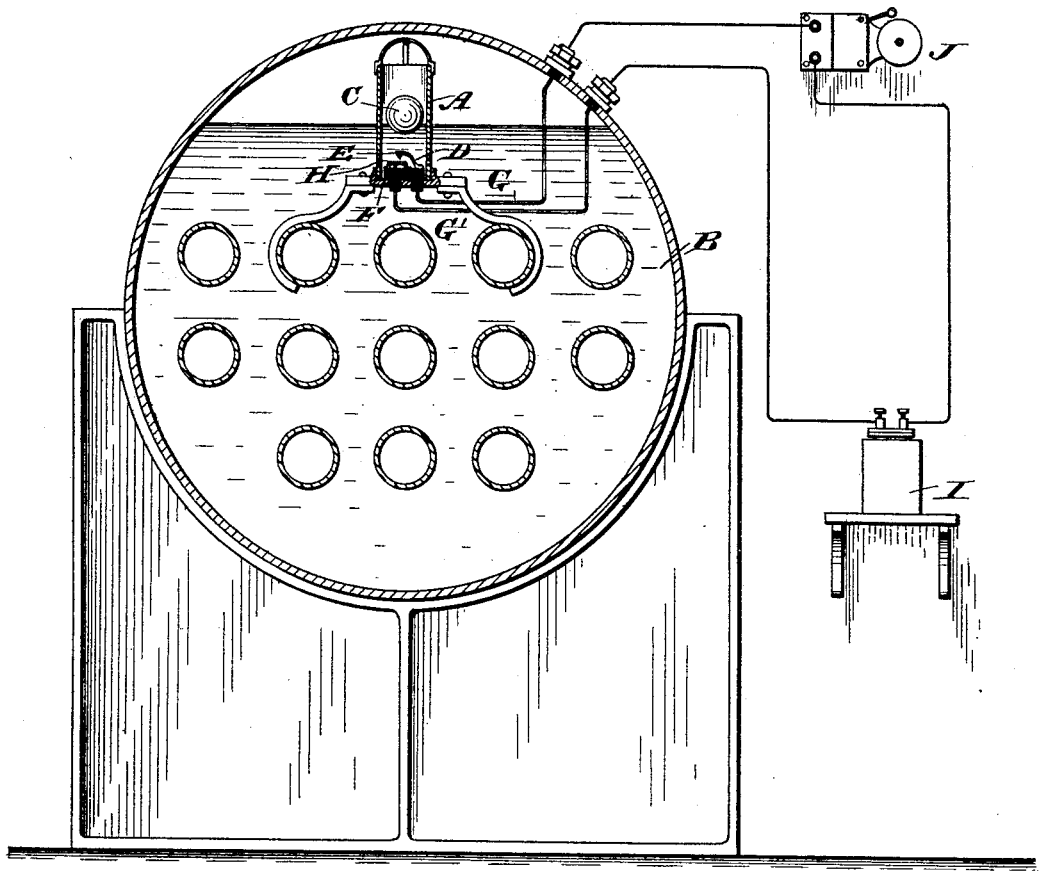
WITNESSES
H. Walker
C. Sedgwick
INVENTOR:
S. M. Mathews
BY
Munn & Co.
ATTORNEYS

UNITED STATES PATENT OFFICE.

STEPHEN MARTIN MATHEWS, OF RAT PORTAGE, ONTARIO, CANADA.

ELECTRIC ALARM.

SPECIFICATION forming part of Letters Patent No. 477,950, dated June 28, 1892.

Application filed November 16, 1891. Serial No. 411,991. (No model.)

*To all whom it may concern:*

Be it known that I, STEPHEN MARTIN MATHEWS, of Rat Portage, in the Province of Ontario and Dominion of Canada, have invented a new and Improved Electric Alarm, of which the following is a full, clear, and exact description.

The object of the invention is to provide a new and improved electric alarm which is simple and durable in construction and especially designed for use on boilers to give an alarm at the time the water reaches the lowermost predetermined level.

The invention consists of a float controlled by the water in the boiler and adapted to rest on and to press a spring for making an electric circuit.

The invention also consists of certain parts and details and combinations of the same, as will be hereinafter fully described, and pointed out in the claim.

Reference is to be had to the accompanying drawing, forming a part of this specification, in which the figure is a sectional side elevation of the improvement as applied within the boiler.

The improved electric alarm is provided with a casing A, preferably made in the shape of a cylinder and arranged in the boiler B. The casing A is in communication with the water in the boiler, so that the latter rises and falls in the casing the same as in the boiler.

Within the casing A is held loosely a ball C, floating in the water within the casing and rising and falling with the water. When the water reaches the predetermined lowermost level, the ball C rests on top of a spring D, formed with a contact-point E at its free end and secured on an insulated plate F, attached to the bottom of the casing A. The spring D is connected with a wire G, passing through the insulated plate F and forming part of an electric circuit, the other wire G' belonging to the circuit also passing through the plate F and connecting with the contact-plate H, secured on the plate F and adapted to be engaged by the point E when the spring D is pressed on by the weight of the ball C when the water reaches a lowermost position within the boiler B and the casing A.

The wires G and G' are connected in the usual manner with a battery I or other suitable source of electric supply, and in the circuit of the wires is arranged an alarm J, of any approved construction. The spring D in its normal position has its contact-point E out of contact with the plate H, as plainly illustrated. Now when the water in the boiler B falls to a lowermost or dangerous water-level then the ball C rests on and presses the spring D, so that the free end carrying the contact-point E is brought into contact with the plate H, so that an electric circuit is established in the wires G and G' and the alarm J is sounded.

The casing A is supported by suitable brackets or other means in the water, the brackets being attached to the tubes or flues, as shown. On top of the casing is arranged a guard to prevent the ball C from floating out of the casing A when the water rises in the boiler.

Having thus fully described my invention, I claim as new and desire to secure by Letters Patent—

An electric alarm comprising the vertical tube or casing A within the water-space of the boiler, open at its upper end, closed at its lower end, and provided with apertures through its sides for the water, a cage on the upper end of the tube or casing, brackets or arms connecting its lower end with the boiler flues or tubes, a float within the casing, electric wires entering the bottom of the casing, a spring to connect them when depressed by the fall of the float, and a battery and alarm in the circuit, substantially as described.

STEPHEN MARTIN MATHEWS.

Witnesses:
   JNO. W. VOLCLEUGH,
   E. W. BRYDGES.